(12) United States Patent
Filliman

(10) Patent No.: US 7,145,605 B2
(45) Date of Patent: Dec. 5, 2006

(54) SYNCHRONIZATION OF CHROMA AND LUMA USING HANDSHAKING

(75) Inventor: Paul Dean Filliman, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 429 days.

(21) Appl. No.: 10/496,680

(22) PCT Filed: Nov. 22, 2002

(86) PCT No.: PCT/US02/37559
§ 371 (c)(1),
(2), (4) Date: May 26, 2004

(65) Prior Publication Data
US 2004/0257468 A1  Dec. 23, 2004

Related U.S. Application Data

(60) Provisional application No. 60/333,435, filed on Nov. 27, 2001.

(51) Int. Cl.
H04N 11/06 (2006.01)
(52) U.S. Cl. .............. 348/488; 348/708; 348/712; 348/713; 348/500
(58) Field of Classification Search .......... 348/488, 348/708, 712–713, 720–721, 500, 510, 512–514, 348/516–520, 571, 578; H04N 11/06, 9/64
See application file for complete search history.

(56) References Cited

U.S. PATENT DOCUMENTS

| 4,698,678 | A | | 10/1987 | Collins | ............. 358/148 |
| 4,839,743 | A | * | 6/1989 | Best et al. | ........... 386/31 |
| 5,818,512 | A | * | 10/1998 | Fuller | ............. 725/82 |
| 5,872,784 | A | * | 2/1999 | Rostoker et al. | ....... 370/395.64 |

FOREIGN PATENT DOCUMENTS

WO 97/39589 10/1997

OTHER PUBLICATIONS

Copy of search report dated Mar. 13, 2003.

* cited by examiner

Primary Examiner—Trang U. Tran
(74) Attorney, Agent, or Firm—Joseph S. Tripoli; Robert D. Shedd; William A. Lagoni

(57) ABSTRACT

An apparatus for synchronizing chroma and luma data includes a first handshake block for luma data, a second handshake block for chroma data, and a means for providing a handshake signal to the first block and to the second block based at least in part on a determination that they are both ready to transfer data, and further for inhibiting provision of the handshake signal based at least in part on a determination that at least one of the first block and the second block is not ready to transfer data.

8 Claims, 3 Drawing Sheets

SYNCHRONIZATION OF CHROMA AND LUMA USING HANDSHAKING

PRIORITY CLAIM

This application claims the benefit, under 35 U.S.C. § 365 of International Application PCT/US02/37559, filed Nov. 22, 2002, which was published in accordance with PCT Article 21(2) on Jun. 5, 2003 in English and which claims the benefit of United States Provisional patent application No. 60/333,435, filed Nov. 27, 2001.

This application claims the benefit of United States Provisional Patent Application No. 60/333,435, filed Nov. 27, 2001, entitled "SYNCHRONIZATION OF CHROMA AND LUMA USING HANDSHAKING," which is incorporated herein by reference.

FIELD OF THE INVENTION

The present invention relates to digital video signal processing, and in particular, to an apparatus and method for synchronizing chroma and luma data using handshaking.

BACKGROUND OF THE INVENTION

A typical digital video broadcast is transmitted as a series of frames, with each frame composed of a plurality of lines and each line composed of a plurality of pixels. The color of a pixel can be represented as a mathematical combination of a set of colors which, in some systems, is treated like a dot position in a three-dimensional color space. One conventional color model is called YUV color space, in which the color representation is divided into two types of data, namely, luminance (i.e., overall brightness or "luma") data ("Y") and chrominance (i.e., color or "chroma") data ("U" and "V"). In a YUV system, the chrominance data (U, V) is transmitted in such a way that it can be disregarded by a black and white receiver, which uses only the luminance data (Y) to display a black and white picture, while a color receiver decodes both the luminance and the chrominance data to display a color picture. Another typical, similar color model is YCbCr color space, in which luminance is represented by Y data and chrominance is represented by Cb and Cr data.

Some digital video signal processing integrated circuits have two main data paths, one for chroma signals and one for luma signals. Most of the functions of such integrated circuits may treat these two paths as independent. However, some processing operations may require chroma and luma data to be synchronized at the first pixel of each video line. But historical approaches for synchronizing luma and chroma data have required undesirably high numbers of logic gates and/or memory devices which have increased the sizes and costs of video processing circuits and/or slowed processing speeds.

The present invention is directed to overcoming some of the drawbacks of conventional approaches for synchronizing luma and chroma data.

SUMMARY OF THE INVENTION

An apparatus in a digital video signal processing system for synchronizing chroma data and luma data needed for a downstream process includes a first Ready To Send and Ready To Receive ("RTS/RTR") handshake block (104) for receiving the luma data, a second RTS/RTR handshake block (148) for receiving the chroma data, and a means (330, 350), coupled to the first handshake block (104) and to the second handshake block (148), for providing a Ready To Receive ("RTR") handshake signal to the first handshake block (104) and to the second handshake block (148) based at least in part on a determination that the first handshake block (104) is ready to transfer the luma data while the second handshake block (148) is ready to transfer the chroma data, and further for inhibiting provision of the RTR handshake signal based at least in part on a determination that at least one of the first handshake block (104) and the second handshake block (148) is not ready to transfer data.

A method for synchronizing chroma data and luma data in a digital video signal processing system including a first Ready To Send and Ready To Receive ("RTS/RTR") handshake block (104) coupled to a source of the luma data, a second RTS/RTR handshake block (148) coupled to a source of the chroma data, and a third RTS/RTR handshake block (450) coupled to a downstream destination for the luma data and the chroma data includes the steps of providing a Ready To Receive ("RTR") handshake signal to the first handshake block (104) and to the second handshake block (148) based at least in part on a determination that the first handshake block (104) is ready to transfer the luma data while the second handshake block (148) is ready to transfer the chroma data and inhibiting the step of providing the RTR handshake signal based at least in part on a determination that at least one of the first handshake block (104) and the second handshake block (148) is not ready to transfer data.

DETAILED DESCRIPTION OF THE PREFERRED EMBODIMENT

The characteristics and advantages of the present invention will become more apparent from the following description, given by way of example.

Figure 1:
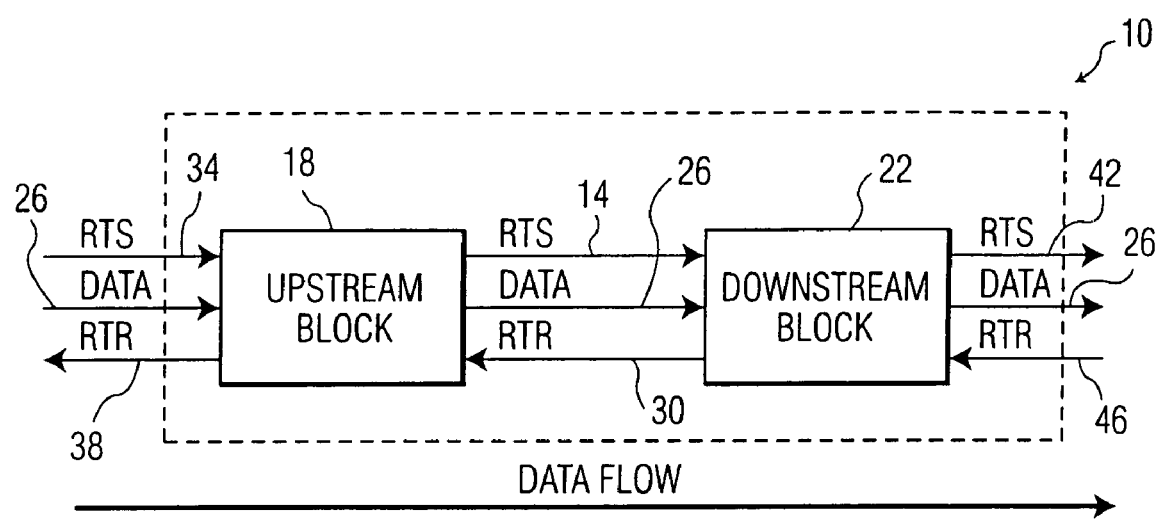
FIG. 1 is a block diagram of a conventional synchronous Ready To Send and Ready To Receive ("RTS/RTR") handshake block.

FIG. 1 is a block diagram of a conventional synchronous Ready To Send and Ready To Receive ("RTS/RTR") handshake block 10. In the handshake block 10, a first handshake channel 14 couples an upstream block 18 to a downstream block 22. First handshake channel 14 is configured to carry a Ready To Send ("RTS") handshake signal, which is active to indicate that upstream block 18 is prepared to send at least one word of data over a data bus 26 to downstream block 22. Meanwhile, a second handshake channel 30 further couples upstream block 18 to downstream block 22. Second handshake channel 30 is configured to carry a Ready To Receive ("RTR") handshake signal, which is active to indicate that downstream block 22 is prepared to accept at least one word of data from upstream block 18 via data bus 26. When a controller (not shown) detects both handshake signals during a clock cycle, a handshake is considered to have occurred. During each clock cycle for which a handshake has occurred, the controller causes one word of data to be transferred from upstream block 18 to downstream block 22 via data bus 26. In a similar manner, an additional handshake channel 34 and an additional handshake channel 38 may be configured to carry an additional RTS handshake signal and an additional RTR handshake signal, respectively, to facilitate data transfers from a further upstream block (not shown) to block 18 over data bus 26; and an additional handshake channel 42 and an additional handshake channel 46 may be configured to carry an additional RTS handshake signal and an additional RTR handshake signal, respectively, to facilitate data transfers to a further downstream block (not shown) from block 22 over data bus 26.

Figure 2:
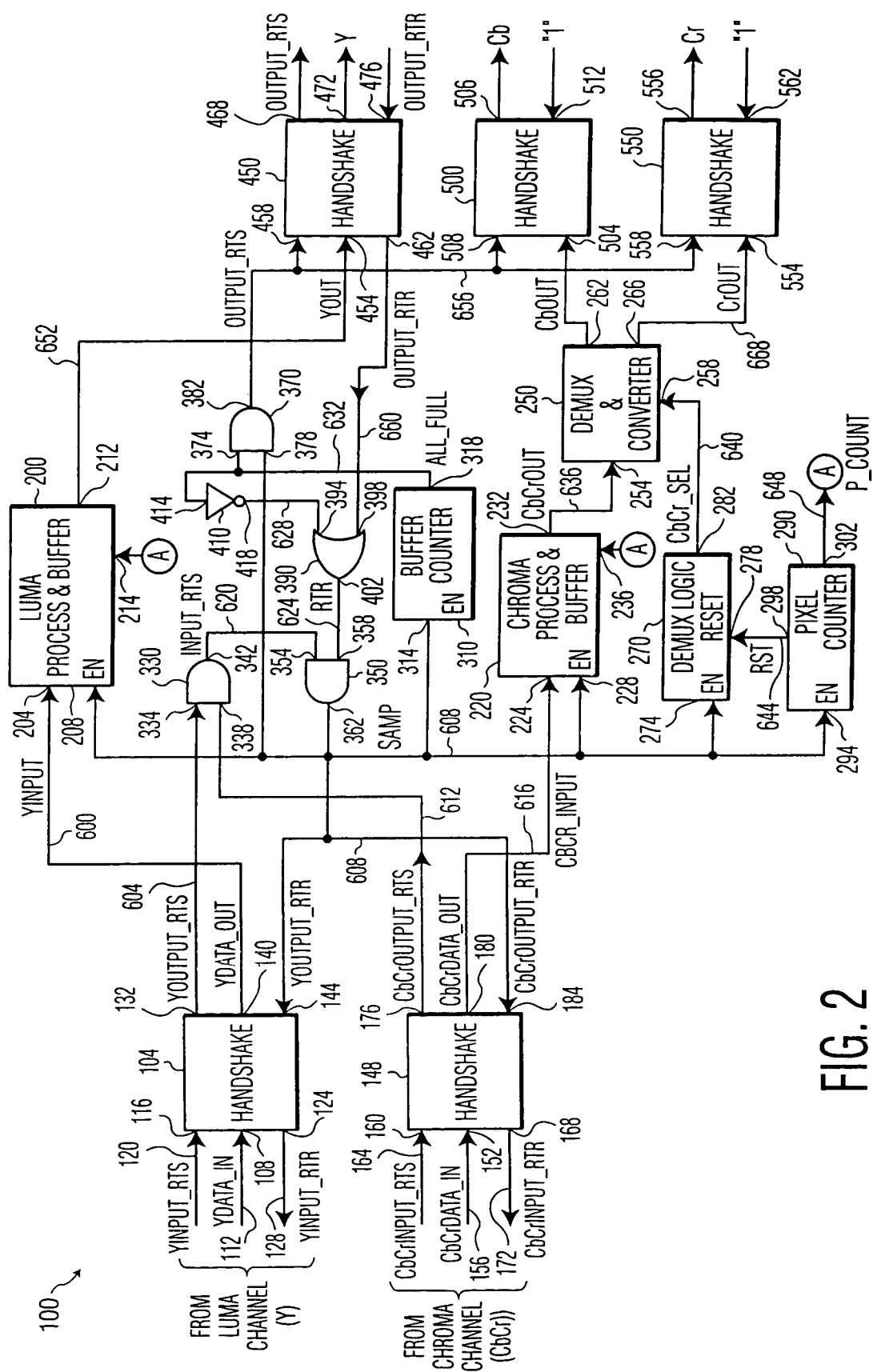
FIG. 2 is a block diagram of an exemplary circuit for synchronizing chroma and luma data using handshaking according to the present invention.

FIG. 2 is a block diagram of an exemplary circuit 100 for synchronizing chroma and luma data using handshaking according to the present invention. Circuit 100 includes a conventional synchronous Ready To Send and Ready To Receive ("RTS/RTR") handshake block 104. Handshake block 104 includes a data input 108 and is arranged to receive luma data ("ydata_in") from an upstream source of the luma data at input 108 over a data bus 112. Further, handshake block 104 includes a Ready To Send ("RTS") handshake input 116 and is arranged to receive an RTS handshake signal ("yinput_rts") from the upstream source of luma data at input 116 over a conductor 120. Handshake block 104 also includes a Ready To Receive ("RTR") handshake output 124 and is arranged to send an RTR handshake signal ("yinput_rtr") to the upstream source of luma data from output 124 over a conductor 128. Further, handshake block 104 includes an RTS handshake output 132 and is arranged to send an RTS handshake signal ("youtput_rts") from output 132; handshake block 104 includes a data output 140 and is arranged to transfer the luma data ("ydata_out") from output 140; and handshake block 104 includes an RTR handshake input 144 and is arranged to receive an RTR handshake signal ("youtput_rtr") at input 144.

Circuit 100 also includes a conventional synchronous RTS/RTR handshake block 148. Handshake block 148 includes a data input 152 and is arranged to receive multiplexed chroma data ("CbCrdata_in") from an upstream source of the chroma data at input 152 over a data bus 156. Further, handshake block 148 includes an RTS handshake input 160 and is arranged to receive an RTS handshake signal ("CbCrinput_rts") from the upstream source of chroma data at input 160 over a conductor 164. Handshake block 148 also includes an RTR handshake output 168 and is arranged to send an RTR handshake signal ("CbCinput_rtr") to the upstream source of chroma data from output 168 over a conductor 172. Further, handshake block 148 includes an RTS handshake output 176 and is arranged to send an RTS handshake signal ("CbCroutput_rts") from output 176; handshake block 148 includes a data output 180 and is arranged to transfer the multiplexed chroma data ("CbCrdata_out") from output 180; and handshake block 148 includes an RTR handshake input 184 and is arranged to receive an RTR handshake signal ("CbCroutput_rtr") at input 184.

Circuit 100 further includes a luma process and buffer block 200. Block 200 is configured (in any of various well known manners) to provide an overall first-in first-out ("FIFO") buffer of word length, L, and further to filter, reformat, and/or otherwise process the luma data as desired to put it into a predetermined form for further downsteam processing. Block 200 includes a data input 204 for receiving luma data ("YINPUT"), an enable input 208 for receiving an enable signal ("SAMP"), a data output 212 for outputting the processed luma data ("yout"), and a pixel count input 214.

Circuit 100 further includes a chroma process and buffer block 220. Block 220 is configured (in any of various well known manners) to provide an overall first-in first-out ("FIFO") buffer of word length, L (the same length as that of block 200), and further to filter, reformat, and/or otherwise process the chroma data as desired to put it into a predetermined form for further downsteam processing. Block 220 includes a data input 224 for receiving multiplexed chroma data ("CBCR_INPUT"), an enable input 228 for receiving the SAMP enable signal, a data output 232 for outputting the processed multiplexed chroma data ("CbCrout"), and a pixel count input 236.

Circuit 100 also includes a demultiplexer and converter block 250. Block 250 is configured (in any of various well known manners) to demultiplex the CbCrout data and to further to filter, reformat, and/or otherwise process the chroma data as desired to put it into a predetermined form for further downsteam processing. Accordingly, block 250 includes a data input 254 for receiving the multiplexed CbCrout data, a control input 258 for receiving a demultiplexer control signal ("CbCr_sel"), a data output 262 for providing Cb data ("Cbout"), and a data output 266 for providing Cr data ("Crout").

Further, circuit 100 includes a demultiplexer logic block 270. Block 270 is configured (in any of various well known manners) to provide the CbCr_sel control signal for demultiplexer and converter block 250. Block 270 includes an enable input 274, a reset input 278, and a control signal output 282 for providing the CbCr_sel control signal.

Circuit 100 also includes a pixel counter 290. Pixel counter 290 is configured (in any of various well known manners) to provide a count of the pixels for each video line ("p_count") as the luma and chroma data arrive and move through circuit 100 and to provide a reset signal ("rst") corresponding to the end of each line. Counter 290 includes an enable input 294, a reset signal output 298, and a pixel count output 302.

Circuit 100 further includes a buffer counter 310. Buffer counter 310 is configured (in any of various well known manners) to indicate whether luma process and buffer block 200 and chroma process and buffer block 220 have filled with data by making a status signal ("ALL_FULL") a logical 1 after being enabled for L clock cycles (after power up) and making ALL_FULL a logical 0 otherwise. Counter 310 includes an enable input 314, and a status signal output 318.

Circuit 100 also includes an AND gate 330. AND gate 330 includes an input 334, an input 338, and an output 342. Further, circuit 100 includes an AND gate 350. AND gate 350 includes an input 354, an input 358, and an output 362. Also, circuit 100 includes an AND gate 370. AND gate 370 includes an input 374, an input 378, and an output 382. Circuit 100 also includes an OR gate 390. OR gate 390 includes an input 394, an input 398, and an output 402. Additionally, circuit 100 includes an inverter 410. Inverter 410 includes an input 414 and an output 418.

Further, circuit 100 includes a conventional synchronous RTS/RTR handshake block 450. Handshake block 450 includes a data input 454 and is arranged to receive the yout luma data from block 200 at input 454. Handshake block 450 also includes an RTS handshake input 458 and is arranged to receive an RTS handshake signal ("output_rts") from AND gate 370 at input 458. Handshake block 450 also includes an RTR handshake output 462 and is arranged to send an RTR handshake signal ("output_rtr") to OR gate 390 from output 462. Further, handshake block 450 includes an RTS handshake output 468 and is arranged to transfer the output_rts RTS handshake signal from output 468 to a downstream block; handshake block 450 includes a data output 472 and is arranged to transfer the yout luma data ("Y") to the downstream block from output 472; and handshake block 450 includes an RTR handshake input 476 and is arranged to receive the output_rtr RTR handshake signal from the downstream block at input 476.

Circuit 100 also includes a conventional synchronous RTS/RTR handshake block 500. Handshake block 500 includes a data input 504 and is arranged to receive the Cbout chroma data from block 250 at input 504, and includes a data output 506 and is arranged to transfer the Cbout data ("Cb") to the downstream block from output 506. Handshake block 500 also includes an RTS handshake input 508 and is arranged to receive the output_rts RTS handshake signal from AND gate 370 at input 508. Handshake block 500 further includes an RTR handshake input 512, which is coupled to a logical 1.

Circuit 100 also includes a conventional synchronous RTS/RTR handshake block 550. Handshake block 550 includes a data input 554 and is arranged to receive the Crout chroma data from block 250 at input 554, and includes a data output 556 and is arranged to transfer the Crout data ("Cr") to the downstream block from output 556. Handshake block 550 also includes an RTS handshake input 558 and is arranged to receive the output_rts RTS handshake signal from AND gate 370 at input 558. Handshake block 550 further includes an RTR handshake input 562, which is coupled to a logical 1.

Further, circuit 100 includes a data bus 600 that couples output 140 of handshake block 104 to input 204 of block 200, a conductor 604 that couples output 132 of handshake block 104 to input 334 of AND gate 330, a conductor 608 that couples input 144 of handshake block 104 to input 184 of handshake block 148 and to enable input 208 of block 200 and to input 378 of AND gate 370 and to output 362 of AND gate 350 and to enable input 314 of counter 310 and to enable input 228 of block 220 and to enable input 274 of block 270 and to enable input 294 of counter 290, a conductor 612 that couples output 176 of handshake block 148 to input 338 of AND gate 330, a data bus 616 that couples output 180 of handshake block 148 to input 224 of block 220, and a conductor 620 that couples output 342 of AND gate 330 to input 354 of AND gate 350.

Circuit 100 also includes a conductor 624 that couples input 358 of AND gate 350 to output 402 of OR gate 390, a conductor 628 that couples output 418 of inverter 410 to input 394 of OR gate 390, a conductor 632 that couples output 318 of counter 310 to input 414 of inverter 410 and to input 374 of AND gate 370, a data bus 636 that couples output 232 of block 220 to input 254 of block 250, a conductor 640 that couples output 282 of block 270 to input 258 of block 250, a conductor 644 that couples output 298 of counter 290 to input 278 of block 270, and a conductor 648 that couples output 302 of counter 290 to input 214 of block 200 and to input 236 of block 220.

Circuit 100 also includes a data bus 652 that couples output 212 of block 200 to input 454 of handshake block 450, a conductor 656 that couples output 382 of AND gate 370 to input 458 of handshake block 450 and to input 508 of handshake block 500 and to input 558 of handshake block 550, a conductor 660 that couples output 462 of handshake block 450 to input 398 of OR gate 390, a conductor 664 that couples output 262 of block 250 to input 504 of handshake block 500, and a conductor 668 that couples output 266 of block 250 to input 554 of handshake block 550.

In operation of circuit 100 (see FIG. 2), unsynchronized luma data (ydata_in) and chroma data (multiplexed, CbCr-data_in) come from the upstream luma channel and the upstream chroma channel, respectively. The signal INPUT_RTS becomes logical 1 only when: 1.) the upstream source of the luma data becomes ready to send the luma data (the youtput_rts signal becomes logical 1), and 2.) the upstream source of the chroma data becomes ready to send the chroma data (the CbCroutput_rts signal becomes logical 1). Meanwhile, the upstream luma channel and the upstream chroma channel are prevented from transferring data when INPUT_RTS is not logical 1 (i.e., when the luma and chroma data transfers would not be synchronized) because any logical 0 into AND gate 350 makes the signal youtput_rtr and the signal CbCroutput_rtr both logical 0.

The RTR signal becomes logical 1 when: 1.) the downstream process becomes ready to receive data (the output_rtr signal becomes logical 1), or 2.) more data is needed to fill the lengths of luma process and buffer 200 and chroma process and buffer 220.

AND gate 350 operates on the INPUT_RTS signal and the RTR signal to provide the SAMP signal. When the SAMP signal becomes logical 1, the signals Y_INPUT and CBCR_INPUT have synchronized luma and chroma data. At this time, circuit 100 enables luma process and buffer 200 and chroma process and buffer 220 as well as buffer counter 310, pixel counter 290, and demultiplexer block 270, and, accordingly, synchronously latches data into luma process and buffer 200 and chroma process and buffer 220.

When SAMP becomes logical 0, there is either: 1.) no luma or chroma data at input 108 or input 152 (and, accordingly, INPUT_RTS is logical 0), or 2.) the luma and chroma data are not synchronized (INPUT_RTS is logical 0), or 3.) the downstream process is not ready to receive data (RTR is logical 0) and luma process and buffer 200 and chroma process and buffer 220 are full (ALL_FULL is logical 1, which in turn makes RTR logical 0). In any event, when SAMP is logical 0 all data transfers into and/or out of circuit 100 are suspended.

Thus, circuit 100 provides synchronized luma and chroma data at outputs 472, 506, and 556, respectively, when the downstream process is ready to receive the data. It should be appreciated that since the data is provided in synchronism, full handshaking is needed only for handshake block 450, and some of the conventional handshaking signals are not necessary for handshake block 500 and handshake block 550 (see FIG. 2).

Figure 3:
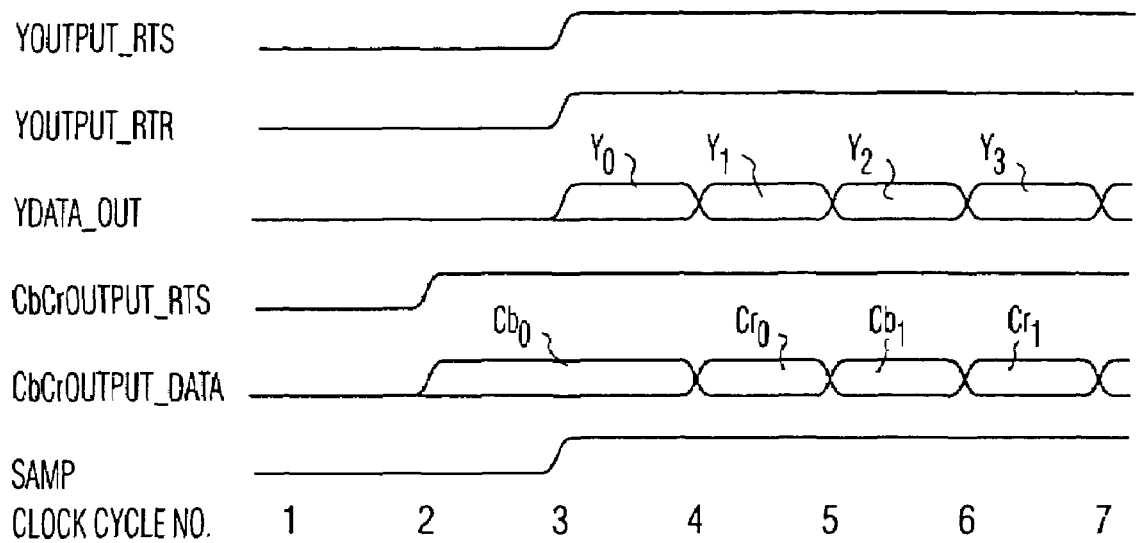
FIG. 3 is a timing diagram for one exemplary operational scenario for the circuit of FIG. 2.

FIG. 3 is a timing diagram for one exemplary operational scenario for the circuit 100 of FIG. 2. At clock cycle No. 2, the chroma data arrives at circuit 100 (before the luma data arrives). Circuit 100 suspends further flow of the chroma data until the luma data becomes available at clock cycle No. 3. After both the luma data and the chroma data become available, circuit 100 provides synchronous flow of the data (clock cycle No. 3 and beyond). It should be appreciated, however, that FIG. 3 is merely exemplary and numerous other operational scenarios may exist for circuit 100.

Figure 4:
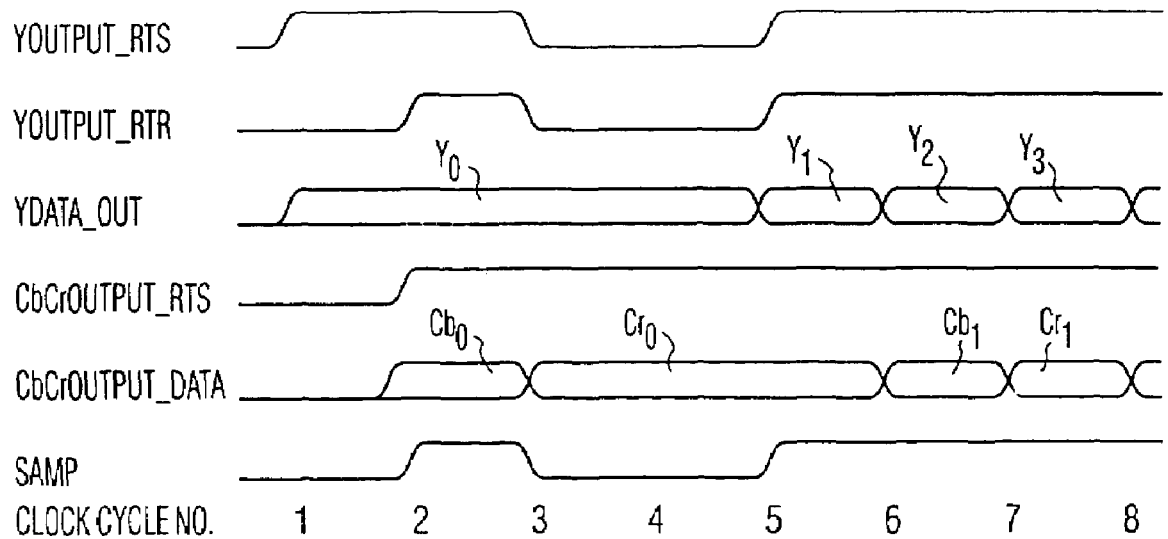
FIG. 4 is a timing diagram for another exemplary operational scenario for the circuit of FIG. 2.

FIG. 4 is a timing diagram for another exemplary operational scenario for the circuit 100 of FIG. 2. At clock cycle No. 1, the luma data arrives at circuit 100 (before the chroma data arrives). Circuit 100 suspends further flow of the luma data until the chroma data becomes available at clock cycle No. 2. When both the luma data and the chroma data become available at clock cycle No. 2, circuit 100 provides synchronous flow of the data until the luma data becomes unavailable from the upstream source at clock cycle No. 3. Then, circuit 100 again suspends flow of the chroma data until the luma data again becomes available at clock cycle No. 5, after which circuit 100 again provides synchronous luma and chroma data flow. It should be appreciated, however, that FIG. 4 is merely exemplary and numerous other operational scenarios may exist for circuit 100.

The invention claimed is:

1. An apparatus in a digital video signal processing system for synchronizing chroma data and luma data needed for a downstream process, the apparatus comprising:
    a first Ready To Send and Ready To Receive handshake block arranged to receive the luma data;
    a second RTS/RTR handshake block arranged to receive the chroma data; and
    a means, coupled to the first handshake block and to the second handshake block, for providing a Ready To Receive handshake signal to the first handshake block and to the second handshake block based at least in part on a determination that the first handshake block is ready to transfer the luma data while the second handshake block is ready to transfer the chroma data, and further for inhibiting provision of the RTR handshake signal based at least in part on a determination that at least one of the first handshake block and the second handshake block is not ready to transfer data.

2. The apparatus of claim 1, further comprising:
    a third RTS/RTR handshake block arranged to send at least one of the luma data and the chroma data to the downstream process; and
    a means, coupled to the RTR handshake signal means and to the third handshake block, for inhibiting provision of the RTR handshake signal based at least in part on a determination that the third handshake block is not ready to receive data.

3. The apparatus of claim 2, further comprising:
    a means, coupled to the first handshake block and to the second handshake block and to the third handshake block, for providing a Ready To Send handshake signal to the third handshake block based at least in part on a determination that the first handshake block is ready to transfer the luma data while the second handshake block is ready to transfer the chroma data, and further for inhibiting provision of the RTS handshake signal based at least in part on a determination that at least one of the first handshake block and the second handshake block is not ready to transfer data.

4. The apparatus of claim 1, wherein the means for providing the RTR handshake signal and further for inhibiting provision of the RTR handshake signal includes a means for determining that the at least one of the first handshake block and the second handshake block is not ready to transfer data.

5. The apparatus of claim 4, wherein the means for determining that the at least one of the first handshake block and the second handshake block is not ready to transfer data consists essentially of an AND gate.

6. A method for synchronizing chroma data and luma data in a digital video signal processing system including a first Ready To Send and Ready To Receive handshake block coupled to a source of the luma data, a second RTS/RTR handshake block coupled to a source of the chroma data, and a third RTS/RTR handshake block coupled to a downstream destination for the luma data and the chroma data, the method comprising the steps of:
    providing a Ready To Receive handshake signal to the first handshake block and to the second handshake block based at least in part on a determination that the first handshake block is ready to transfer the luma data while the second handshake block is ready to transfer the chroma data; and
    inhibiting the step of providing the RTR handshake signal based at least in part on a determination that at least one of the first handshake block and the second handshake block is not ready to transfer data.

7. The method of claim 6, further comprising the step of inhibiting the providing step based at least in part on a determination that the third handshake block is not ready to receive data.

8. The method of claim 7, further comprising the steps of:
    providing a Ready To Send handshake signal to the third handshake block based at least in part on a determination that the first handshake block is ready to transfer the luma data while the second handshake block is ready to transfer the chroma data; and
    inhibiting the step of providing the RTS handshake signal based at least in part on a determination that at least one of the first handshake block and the second handshake block is not ready to transfer data.

* * * * *